Figure 3:
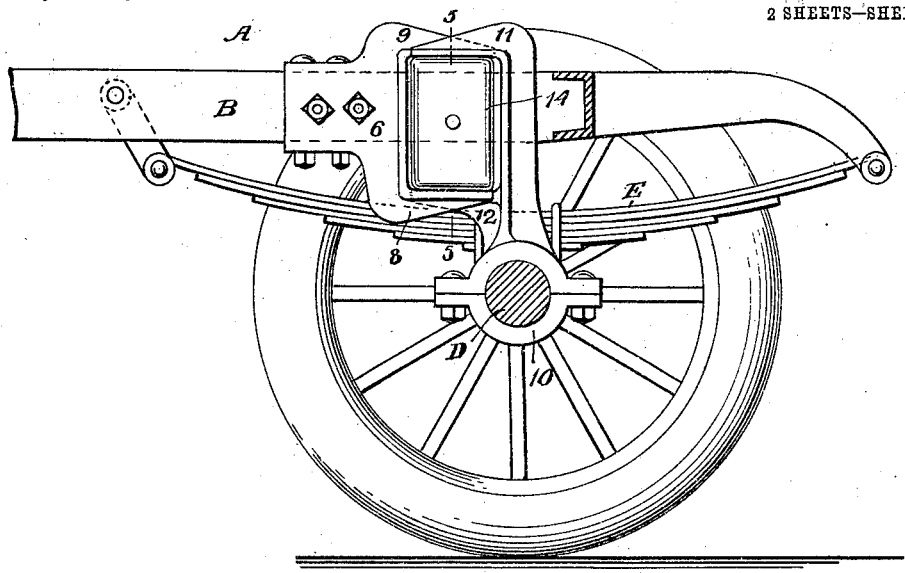

W. REYNOLDS.
SHOCK ABSORBER.
APPLICATION FILED OCT. 11, 1912.
1,088,093.
Patented Feb. 24, 1914.
2 SHEETS—SHEET 1.
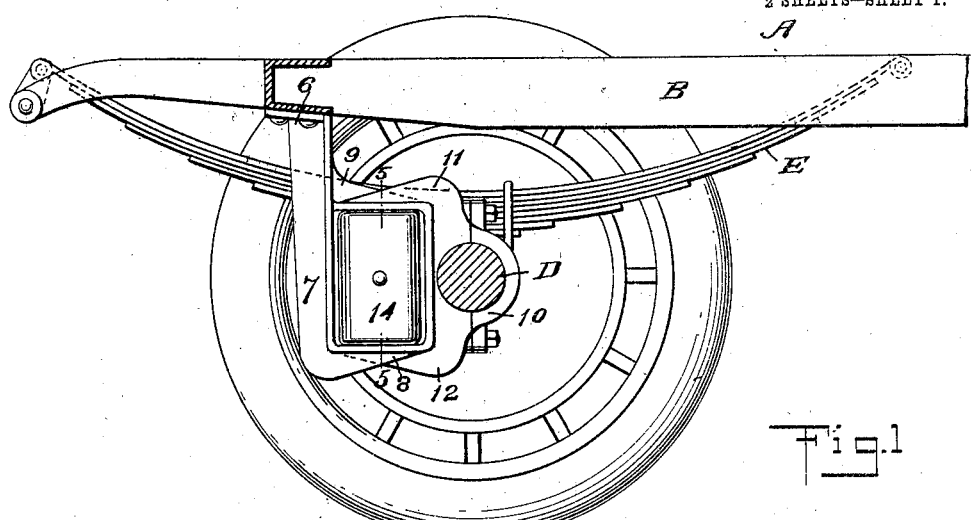
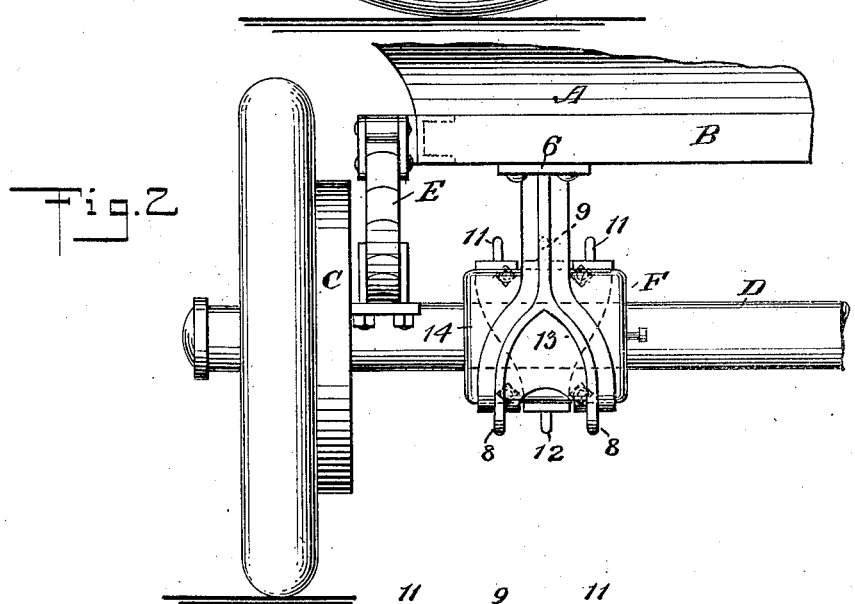
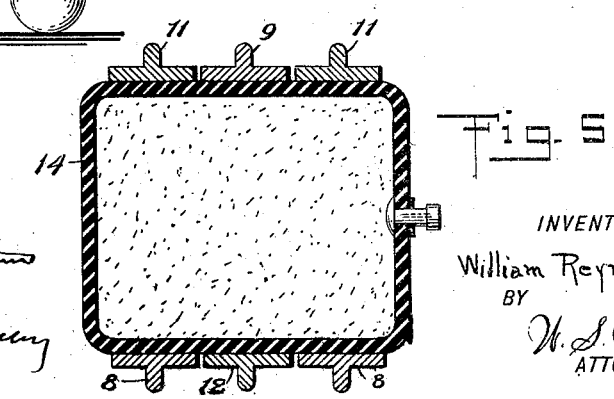
WITNESSES:
INVENTOR
William Reynolds.
BY
W. S. Orton.
ATTORNEY.

W. REYNOLDS.
SHOCK ABSORBER.
APPLICATION FILED OCT. 11, 1912.

1,088,093.

Patented Feb. 24, 1914.
2 SHEETS—SHEET 2.

WITNESSES:

INVENTOR
William Reynolds.
BY
W. S. Orton.
ATTORNEY.

UNITED STATES PATENT OFFICE.

WILLIAM REYNOLDS, OF NEW YORK, N. Y.

SHOCK-ABSORBER.

1,088,093.          Specification of Letters Patent.        Patented Feb. 24, 1914.

Application filed October 11, 1912. Serial No. 725,134.

*To all whom it may concern:*

Be it known that I, WILLIAM REYNOLDS, residing at New York, in the county and State of New York, and being a citizen of the United States, have invented certain new and useful Improvements in Shock-Absorbers, of which the following is a full, clear, and exact description.

My invention relates to a shock absorber for vehicles, and more particularly relates to a vibration compensator or cushioning device.

The primary object of my invention is to eliminate the minute vibration in the running gear and to prevent the transmission of shocks from the running gear to the body of the vehicle, and in effect to maintain the body substantially in a line parallel with the mean normal level of the road.

A yet further object is to provide a device of the above indicated character which can be readily installed on the usual automobile vehicle without a re-arrangement of old parts, and finally it is desirable to provide a simple, inexpensive pneumatic suspension of relatively few parts.

In this art it has been usual to suspend the running gear by means of a metal spring or an equivalent support of sufficient rigidity to support the normal load, but these metal springs while permitting the running gear, hereinafter referred to as the axle, to drop away in a direction parallel thereto or at an angle with the body, as when a wheel on one side is sinking into a depression in the road, are relatively slow in their return to their normal position; and further possess the disadvantage that they go beyond their normal position and vibrate back and forth until the distorting force is entirely absorbed. This movement is conveyed from the springs to the vehicle and in cases where other distorting shocks are superimposed upon the phases of the vibratory periods of the oscillating springs, an irritating shaking of the vehicle results.

Forming part of the pertinent art, it is known to interpose an air cushion between the downwardly bearing body and the axle; that is, to rest the weight of the body on a cushioning device, and it is also known to position a buffer, cushion, or stop to take up the downward shock of the vehicle, especially when the springs have been compressed to their capacity, but all of these devices merely cushion the body in its movement toward the axle.

As the desideratum of this invention is to maintain the body of the vehicle steady in its longitudinal travel, it will hereinafter be considered as a stationary body and the axle as a relatively vibrating member, moving in both directions vertically or in a line connecting the vehicle and axle.

In order to deaden the minute vibration characterizing the axle in service, I have provided a means to continually oppose its movement in either direction by a device which will prolong the transmission of the movement of the axle, so that in a unit of time the body will move in a vertical direction a distance, the resultant equal to the algebraic sum of the up and down movement of the axle during the unit of time. In other words, if the vehicle is moving downhill the constant lowering of the axle will eventually draw the body downward, but the effects on the body of small ridges and depressions passed over in descending the hill will be neutralized.

I attain the above outlined object by confining the axle in its relation to the body by means of a cushion or similar inert or non-vibratory body, the word cushion in this specification excluding vibrating bodies or bodies capable of vibratory movement, such as metal springs.

For the purpose of disclosing a physical embodiment of my invention, such as will enable others skilled in the art to which it appertains to make and to use the same, reference is had to the accompanying drawing which illustrates the preferred form of the invention; though it is to be understood that the invention is not limited to the exact details of construction shown and described, as it is obvious that various modifications thereof will occur to persons skilled in the art.

Figure 4:
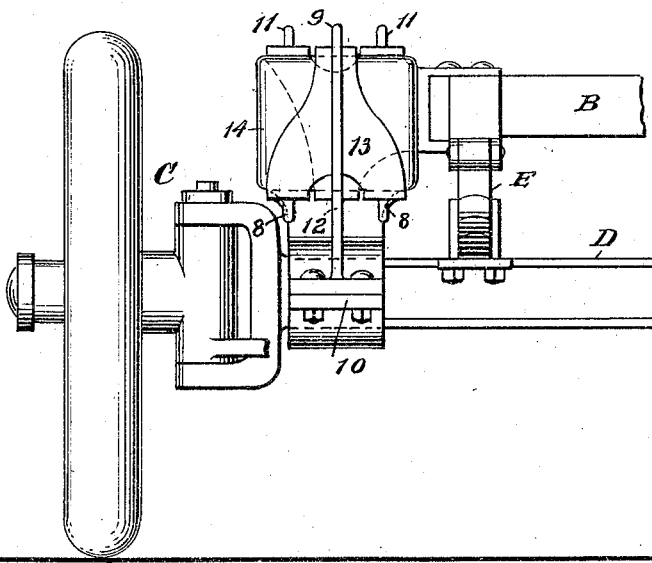

In said drawings: Figure 1 is a side elevation of the rear portion of a vehicle showing a form of my invention applied thereto. Fig. 2 is a rear elevation of the construction shown in Fig. 1, including a portion of the running gear and body. Fig. 3 is a view similar to Fig. 1, showing a modified form of the invention particularly adapted for the front running gear. Fig. 4 is a front elevation of the modified form shown in Fig. 3, Fig. 5 is a vertical transverse sectional view of the cushion and bracket arms, and taken on a plane indicated by the line 5—5 of Figs. 1 and 3.

Described more in detail I have shown a vehicle for my invention taking the form of a conventional automobile design having the usual frame or body portion A, carried by the chassis B, both parts herein referred to as a body; the running gear C including the axle D, herein referred to as the axle and a conventional form of spring suspension E.

Disposed between the axle and the adjacent portion of the body, preferably one on each side of a longitudinal median line, is the cushioning device F, particularly forming the subject-matter of my invention. The location and disposition of these cushions must necessarily depend upon the design of the vehicle to which they are applied, but it is desirable to place a pair to each axle, and as close to the outer end of the same as possible, in order to get the greatest leverage therefrom to oppose side lash and transverse rocking.

The cushion comprises broadly a pair of overlapping brackets and a pneumatic cushion disposed between the overlapping parts thereof. Referring particularly to the disclosure in Figs. 1 and 2, there is shown fastened to and depending from the body A a bracket, preferably in the form of a pressing or casting 6, and comprising a depending arm 7 disposed to the rear of the axle D, projecting forwardly from which and toward the axle are a pair of vertically spaced apart ledges 8 and 9.

For a purpose hereinafter described, the lower portion of the arm 6 is bifurcated, as shown in Figs. 1, 4 and 5, to form the ledge 8 into a pair of lower horizontally spaced apart seats uncovering the upper ledge 9 and disposed on opposite sides thereof.

Suitably keyed or yoked to the axle D is a similarly shaped bracket 10, which, in the form shown in Fig. 4, is a horizontally disposed U casting. The arms or ledges 11 and 12 extend rearwardly from the wide crotch 13 which is keyed to the axle and intermesh with the ledges 8 and 9. This is afforded by forming the upper ledge 11 into two spaced apart seats straddling the upper ledge 9.

Disposed between the ledges 8, 9, 11 and 12 is a pneumatic cushion 14, herein shown to be a reinforced rubber bag in the form of an oblate spheroid filled with air under relatively high pressure, in Figs. 1 to 5.

It will be noted that the tendency of the bag is to retard or cushion the axle in either direction relative to the body.

Should the axle be in the act of dropping away from the body, the seats comprising the upper ledge 11 press into the cushion 14, adjacent opposite ends of the top thereof, while the seats directly below are carried by the body, and, of course, are stationary relative to the body. Also under this condition the attached middle upper ledge 9 is, of course, stationary, while the middle lower ledge 12 moves downward with the axle and ledge 11. The effect of this movement is to distort the cushion into an undulatory form, reducing its volume, and consequently increasing the compressive force of the air which is constantly opposing the distorting force.

This device is particularly effective in cushioning the travel of the axle in its movement toward the body, for in this case the ledge 12 moves toward the stationary ledge 9, compressing the cushion 14 therebetween. It is noted that the same cushioning effect is obtained irrespective of the direction of movement of the axle.

In the embodiment illustrated, the brackets are so arranged that the cushion is free to bulge transversely when the ledges of the brackets move toward each other. A movement of the running gear and body relative to each other will cause oppositely disposed ledges to approach each other even to the point of bearing on one another, compressing the cushion therebetween. The cushion is constructed to have an unconfined air containing portion thereof free to extend outside of the space between the ledges. It is obvious that the greater the ratio between the size or rather air volume of the cushion to the cushion-engaging area of the flanges, the less variance there will be from the initial pressure in the cushion when the cushion is distorted under the action of running gear and body so that, in the practical utilization of the invention it will be desirable to make the cushion of the largest possible volume and the cushion-engaging ledges of the least possible area thereby permitting the use of a light pliable bag of a strength merely sufficient to withstand the slight increase in pressure incidental to the normal light shocks thereon. The initial pressure in the cushion may be varied to suit the normal load carried by the body and this pressure is preferably as great as can be utilized without depriving the spring E of its body supporting functions but which will permit the cushion to give somewhat under the action of the slightest relative movement between the running gear and body.

What I claim is:

1. In combination with the running gear and body of a vehicle, a pair of coacting brackets, one of said brackets carried by the body and the other bracket carried by the running gear, each bracket having a pair of spaced apart seats disposed in horizontal alinement, and a vertically spaced ledge disposed between the horizontally spaced seats of the other bracket, and a pneumatic cushion disposed between the vertically spaced seats and ledge.

2. In combination with the running gear and body of a vehicle movable relative to each other, of a cushion engaging member attached to the body, a coacting cushion engaging member attached to the gear and a pneumatic cushion having opposite sides continuously in engagement with both of said members whereby any movement of either member in either direction relative to each other will compress a portion of the cushion.

3. In combination with the running gear and body of a vehicle, a member forming a part of the body, a coacting member forming a part of the gear and a cushion having opposite sides continuously engaged by both of said members whereby any movement of either member in either direction relative to each other will be resisted by the cushion.

4. In combination with the running gear and body of a vehicle, a member having vertically spaced apart projecting ledges rigidly fastened to the body, a second member having vertically spaced apart projecting ledges fixedly mounted on said running gear and a single cushion fitting between the ledges of each of said members, and continuously in engagement with the same.

5. In a vehicle, the combination with a running gear and a body, of a pneumatic cushion, a set of ledges carried by the running gear engaging the top and bottom of the cushion and a second set of ledges carried by the body engaging the top and bottom of the cushion, said sets movable toward each other and acting to compress therebetween a portion of the cushion on any movement of the running gear and body relative to each other, a portion of said cushion being free to extend outside of the space between said sets as the sets approach each other.

In witness whereof I have hereunto set my hand in the presence of two witnesses.

WILLIAM REYNOLDS.

Witnesses:
 JULIAN A. ARROYO,
 W. S. ORTON.